D. CONEKIN.
FISHING DEVICE.
APPLICATION FILED JAN. 6, 1915.
1,138,542.
Patented May 4, 1915.
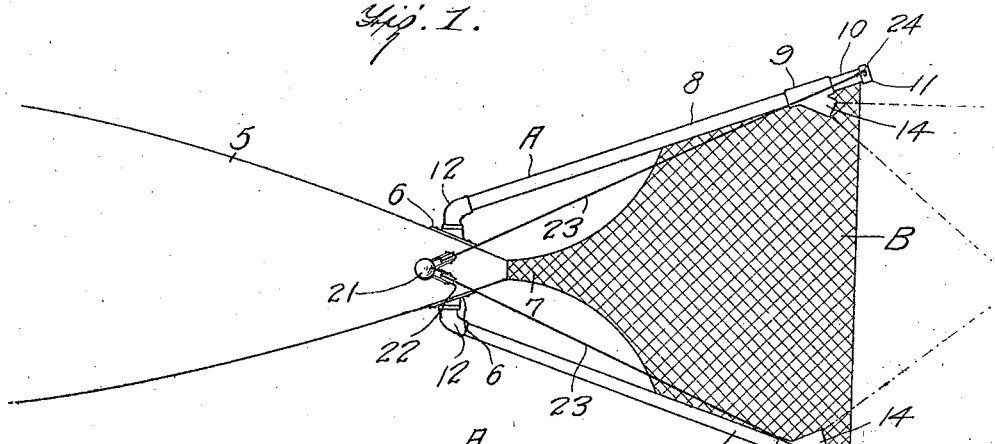
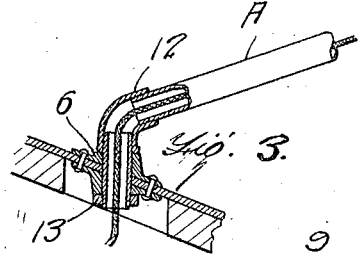
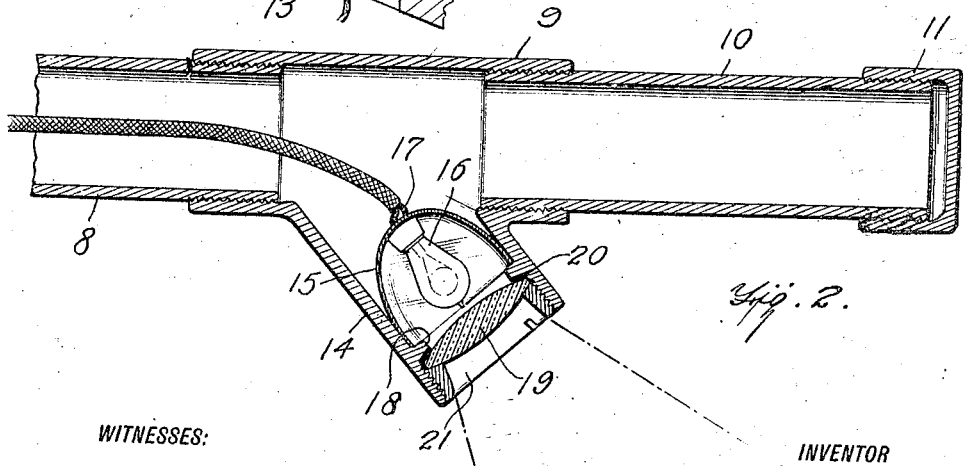
WITNESSES:
L. H. Schmidt
Alan F. Garner
INVENTOR
DAWSON CONEKIN,
BY Munn & Co.
ATTORNEYS

UNITED STATES PATENT OFFICE.

DAWSON CONEKIN, OF ST. PETERSBURG, FLORIDA.

FISHING DEVICE.

1,138,542. Specification of Letters Patent. Patented May 4, 1915.

Application filed January 6, 1915. Serial No. 745.

*To all whom it may concern:*

Be it known that I, DAWSON CONEKIN, a citizen of the United States, residing at St. Petersburg, in the county of Pinellas and State of Florida, have invented certain new and useful Improvements in Fishing Devices, of which the following is a specification.

This invention relates to an improvement in fishing devices of the type set out in my application Serial Number 814,974, filed January 28, 1914, and allowed December 12, 1914.

One of the principal objects of the invention is to provide an improved arrangement whereby electric lights may be carried by the net supporting outriggers in such position as to cast their rays diagonally across the course of the vessel in order to concentrate them immediately in advance of the net in order that fish happening in the zone of illumination may be blinded so as not to notice the approach of the net and vessel.

Another object of the invention is to provide an improved form of outrigger in which an electric light is supported in such position as to cast its rays diagonally across the course of the vessel and in advance of the net.

A further object of the invention is to provide a device of the class described which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a diagrammatical plan view of the apparatus constructed according to my invention. Fig. 2 represents a fragmentary view in section taken longitudinally through a portion of one of the outriggers showing disposition and structure of the lights and analogous parts. Fig. 3 represents a fragmentary view in horizontal section taken through the bearing in which one of the outriggers is carried.

Referring more particularly to the drawing, 5 indicates a vessel in which a cold storage room, elevator compartment and other apparatus (not shown) may be arranged in the manner set forth in my before mentioned prior application.

Journaled in bearings 6 at the prow of the boat are the outriggers A. These outriggers carry a net B which is open at its forward end and is provided with a reduced or contracted throat at its rear end as at 7 leading to the apparatus above described through a suitable passage (not shown).

Each outrigger includes a length of tubing 8 connected by means of a Y-joint 9 at its outer end with a shorter length 10, which latter is closed by a cap 11. The inner end of tube 8 is connected by an elbow 12 with a second short length of tubing 13. The latter extends through the bearings 6 and is preferably open at its inner end. The Y-joint 9 is so disposed that its branch 14 extends over net B in a diagonal line relative to the course of the vessel.

Within the branch 14 is disposed in any desired manner a reflector 15 carrying an electric light bulb 16. The latter connects by means of the wires 17 with a suitable source of electric current. An inwardly extending flange 18 occurs in advance of the reflector 15 and a lens 19 is adapted to be seated against said flange, a suitable washer 20 being disposed between the lens and flange to provide a watertight joint. The threading ring 21 is turned into the threaded outer end of branch 14 into engagement with the lens 19 for maintaining the latter in position. The joints between the various sections of the outriggers are made watertight, so as to prevent entrance of water within the tubes.

An arrangement is provided whereby the outriggers may be raised or lowered at will for disposing the net at desired depths in the water or for raising the same entirely clear from the water. Such apparatus is indicated generally in Fig. 1 and provides a mast 21 on which pulleys 22 are carried near the upper end, said pulleys acting as guides for cables 23 which may be connected at their outer ends to eyes 24 provided on caps 11, and which at their inner ends may be either manipulated by hand or machinery for raising and lowering the outriggers at will.

The wires 17 extend inwardly through the hollow outriggers into the interior of the vessel and as stated above are connected with a suitable source of current whereby preferably intermittent flash light in the bulb 16 is attained. The light, however, may be steady depending upon the requirements in each case. The light passing through the lenses 19 is directed diagonally across the course of the vessel and as indicated in Fig. 1 merges into a zone in advance of the net whereby any fish that may move into the light zone will be blinded by the light so as not to become aware of the approach of the net and vessel and thus dodge them. In this manner an extremely efficient apparatus is provided which serves initially to attract the fish and subsequently to blind them so that they may be caught in the net.

Although I have described the preferred embodiment of my invention, I may desire to make such changes in the construction, combination and arrangement of parts thereof as do not depart from the spirit of the invention and the scope of the appended claims.

I claim:—

1. In a fishing device, the combination with a boat, of a pair of tubular outriggers pivotally connected to the boat at its prow, means for raising and lowering the outriggers at will, a net supported by the outriggers, a Y-joint forming a section of each outrigger and having a branch disposed in a diagonal line with respect to the path of the boat, a light carried by each of the Y-joints and disposed in the diagonal branches thereof, and transparent elements disposed in said branches to prevent entrance of water to the lights, and whereby said lights may direct their rays diagonally across the course of the vessel to merge in advance of the net, substantially as described.

2. The combination with a vessel, of a pair of outriggers pivotally supported near the prow thereof, means whereby said outriggers may be lowered and raised at will, a net supported by said outriggers, and lights carried by the outriggers near the outer ends thereof and adapted to direct their rays diagonally across the course of the vessel to meet in a light zone in advance of the net, substantially as described.

3. The combination with a vessel, of a tubular outrigger pivotally connected therewith, a net associated with the outrigger, an electric light bulb disposed in said outrigger, a transparent element disposed in the outrigger through which rays from said electric light bulb are adapted to pass, said outrigger being open at its inner end, and wires connected to a source of current and to said electric light bulb and passing through said tubular outriggers, substantially as described.

4. The combination with a vessel, of a pair of tubular outriggers having lights disposed therein and also having transparent elements through which the rays of said lights are adapted to pass, a net supported by the outriggers, said lights being disposed whereby to cast their rays toward each other and diagonally across the course of the vessel whereby to create a light zone in advance of the net.

5. The combination with outriggers and a net supported thereby, of a light carried by each of the outriggers, said lights adapted to project their rays diagonally across the path of the net whereby to create a light zone in advance of said net.

6. In a device of the class described the combination with a pair of outriggers and a net supported thereby, of lights carried by the outriggers and adapted to cast their rays diagonally across the path of the net.

DAWSON CONEKIN.

Witnesses:
  THADDEOUS STREET,
  R. H. LOCKWOOD.